(12) United States Patent
Li

(10) Patent No.: US 9,606,650 B2
(45) Date of Patent: Mar. 28, 2017

(54) METHOD AND DEVICE FOR LOCKING AND UNLOCKING WITH TOUCH GRAPHIC

(71) Applicant: Huawei Device Co., Ltd., Shenzhen (CN)

(72) Inventor: Jiangang Li, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 540 days.

(21) Appl. No.: 13/872,302

(22) Filed: Apr. 29, 2013

(65) Prior Publication Data

US 2013/0234971 A1   Sep. 12, 2013

Related U.S. Application Data

(63) Continuation of application No. PCT/CN2011/081252, filed on Oct. 25, 2011.

(30) Foreign Application Priority Data

Oct. 28, 2010   (CN) .......................... 2010 1 0528587

(51) Int. Cl.
G06F 3/041        (2006.01)
G06F 3/0488       (2013.01)
(Continued)

(52) U.S. Cl.
CPC .......... G06F 3/041 (2013.01); G06F 3/04883 (2013.01); G06F 3/04886 (2013.01);
(Continued)

(58) Field of Classification Search
CPC ....... G06F 3/041; G06F 3/04883; G06F 21/31
See application file for complete search history.

(56) References Cited

U.S. PATENT DOCUMENTS

2004/0085351 A1*   5/2004  Tokkonen ...................... 345/741
2005/0253817 A1*  11/2005  Rytivaara et al. ............ 345/173
(Continued)

FOREIGN PATENT DOCUMENTS

CN   101237636 A   8/2008
CN   101371258 A   2/2009
(Continued)

OTHER PUBLICATIONS

Partial English Translation and Abstract of Japanese Patent Application No. JP2004126973A, Oct. 28, 2014, 25 pages.
(Continued)

*Primary Examiner* — Michael Faragalla
*Assistant Examiner* — Chayce Bibbee
(74) *Attorney, Agent, or Firm* — Conley Rose, P.C.

(57) ABSTRACT

A method and a device for locking and unlocking with a touch graphic are provided. The method includes: outputting a randomly changed graphic receiving interface; receiving a touch graphic input by a user by touching through the graphic receiving interface; and performing a locking or unlocking operation according to the touch graphic. The device includes: an interface outputting module configured to output a randomly changed graphic receiving interface; a receiving module configured to receive a touch graphic input by a user by touching through the graphic receiving interface; and a locking and unlocking module configured to perform a locking or unlocking operation according to the touch graphic. The present invention improves security of locking or unlocking with a touch graphic.

16 Claims, 12 Drawing Sheets

(51) Int. Cl.
    *G06F 21/36* (2013.01)
    *H04M 1/67* (2006.01)

(52) U.S. Cl.
    CPC .............. *G06F 21/36* (2013.01); *H04M 1/67* (2013.01); *H04M 2250/22* (2013.01)

(56) References Cited

U.S. PATENT DOCUMENTS

| | | | |
|---|---|---|---|
| 2007/0150842 | A1 | 6/2007 | Chaudhri et al. |
| 2007/0262951 | A1* | 11/2007 | Huie .................... G06F 3/0485 345/156 |
| 2010/0045623 | A1* | 2/2010 | Sakurai ........................ 345/173 |
| 2010/0225443 | A1 | 9/2010 | Bayram et al. |

FOREIGN PATENT DOCUMENTS

| | | |
|---|---|---|
| CN | 101393511 A | 3/2009 |
| CN | 101634925 A | 1/2010 |
| CN | 101866259 A | 10/2010 |
| CN | 101986251 A | 3/2011 |
| JP | 2004102401 A | 4/2004 |
| JP | 2004126973 A | 4/2004 |
| JP | 2005004333 A | 1/2005 |
| JP | 2006243938 A | 9/2006 |

OTHER PUBLICATIONS

Partial English Translation and Abstract of Japanese Patent Application No. JP2006243938A, Oct. 28, 2014, 25 pages.
Foreign Communication From a Counterpart Application, Japanese Application No. 2013535264, Japanese Notice of Allowance dated Sep. 9, 2014, 5 pages.
"WOOT '10," 4th USENIX Workshop on Offensive Technologies, Mar. 12, 2014, 2 pages.
Aviv, A. J., et al., "Smudge Attacks on Smartphone Touch Screens," Department of Computer and Information Science, University of Pennsylvania, 2010, 10 pages.
Aviv, A. J., et al., "CS:43 Computer Networks," Swarthmore College, Fall 2012, Retrieved from: http://www.usna.edu/Users/es/aviv/ on Mar. 12, 2014, 5 pages.
Partial English Translation and Abstract of Japanese Patent Application No. JP2005-004333, May 12, 2014, 16 pages.
Partial English Translation and Abstract of Japanese Patent Application No. JP2004-102401, May 12, 2014, 9 pages.
Foreign Communication From a Counterpart Application, Japanese Application No. 2013-535264, Japanese Office Action dated Apr. 1, 2014, 11 pages.
Foreign Communication From a Counterpart Application, Japanese Application No. 2013-535264, English Translation of Japanese Office Action dated Apr. 1, 2014, 8 pages.
Foreign Communication From a Counterpart Application, Chinese Application No. 201010528587.5, Chinese Office Action dated Nov. 24, 2011, 10 pages.
Foreign Communication From a Counterpart Application, Chinese Application No. 201010528587.5, Partial English Translation of Chinese Office Action dated Nov. 24, 2011, 20 pages.
Foreign Communication From a Counterpart Application, Chinese Application No. 201010528587.5, Chinese Office Action dated May 22, 2012, 14 pages.
Foreign Communication From a Counterpart Application, Chinese Application No. 201010528587.5, Partial English Translation of Chinese Office Action dated May 22, 2012, 27 pages.
Foreign Communication From a Counterpart Application, Chinese Application No. 201010528587.5, Chinese Office Action dated Sep. 5, 2012, 13 pages.
Foreign Communication From a Counterpart Application, Chinese Application No. 201010528587.5, Partial English Translation of Chinese Office Action dated Sep. 5, 2012, 29 pages.
Foreign Communication From a Counterpart Application, PCT Application PCT/CN2011/081252, English Translation of International Search Report dated Jan. 19, 2012, 2 pages.
Foreign Communication From a Counterpart Application, PCT Application PCT/CN2011/081252, English Translation of Written Opinion dated Jan. 19, 2012, 8 pages
Foreign Communication From a Counterpart Application, European Application No. 11835621.1, Extended European Search Report dated Aug. 30, 2013, 10 pages.
"Issue 3146: Screen unlock—Press the dots instead of Join the Dots?," Internet Citation, XP002657172, Jul. 26, 2010, 6 pages.
"Keep your Touchscreen Clean to Protect against Smudge Attacks," XP055075953, Aug. 11, 2010, 6 pages.
Schneier, B., "Schneier on Security, Security Analysis of Smudges on Smart Phone Touch Screens," Internet Citation, XP002657077, Aug. 12, 2010, 5 pages.
"Research Claims Hackers Could Figure Out Your Smartphone Password Via Screen Smudges," Internet Citation, XP002657173, Sep. 24, 2010, 9 pages.
Foreign Communication From a Counterpart Application, PCT Application PCT/CN2011/081252, International Search Report dated Jan. 19, 2012, 2 pages.

* cited by examiner

METHOD AND DEVICE FOR LOCKING AND UNLOCKING WITH TOUCH GRAPHIC

CROSS-REFERENCE TO RELATED APPLICATIONS

This application is a continuation of International Application No. PCT/CN2011/081252, filed on Oct. 25, 2011, which claims priority to Chinese Patent Application No. 201010528587.5, filed on Oct. 28, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to electronic technologies, and in particular, to a method and a device for locking and unlocking with a touch graphic.

BACKGROUND

A gesture lock is a common user encryption and decryption mode on a touch-screen electronic device. Normally, an interface presented by a gesture-locking touch screen to a user is a graphic receiving interface similar to a nine-square grid, and the graphic receiving interface may consist of several points. To use encrypted information on the electronic device or open the touch screen of the electronic device, first, the user connects points that the user sets in advance on the graphic receiving interface of the gesture-locking touch screen to form a touch graphic; the electronic device verifies the touch graphic and then provides information to the user or opens the touch screen of the electronic device. The touch graphic refers to a graphic created by the user by sliding a finger or a stylus pen on the graphic receiving interface to connect multiple points.

Applications of gesture-locking touch screens replace an earlier encryption and decryption mode of manually inputting a character password, which brings the simple and easy-to-use features of the touch-screen electronic device into full play. For example, as shown in FIG. 9, when the user puts a gesture lock on encrypted information or on the touch screen, the user connects several points on the graphic receiving interface similar to a nine-square grid to form a touch graphic of a capital "Z." Circles in FIG. 9 indicate the points, and arrows indicate sliding directions and sliding traces made by a finger or a stylus pen on the touch screen, where the sliding traces connect several points and form the touch graphic of a capital "Z." When the user needs to unlock the encrypted information or the touch screen later, similarly, the user needs to connect several corresponding points to form the shape "Z" on the graphic receiving interface on the touch screen, thereby opening the encrypted information or the touch screen.

At present, gesture locks on electronic devices have been widely applied; however, when the user performs locking or unlocking on the touch screen, inevitably, sweat and grease on a finger may leave a clear track on the touch screen. Another user paying little attention may easily unlock the gesture lock according to the track on the touch screen, which threatens security of personal information of the user, and therefore decreases security of locking or unlocking with a touch graphic.

SUMMARY

The present invention provides a method and a device for locking and unlocking with a touch graphic in order to improve security of locking or unlocking with a touch graphic.

The present invention provides a method for locking and unlocking with a touch graphic, including: outputting a randomly changed graphic receiving interface; receiving a touch graphic input by a user by touching through the graphic receiving interface; and performing a locking or unlocking operation according to the touch graphic.

The present invention provides a device for locking and unlocking with a touch graphic, including: an interface outputting module configured to output a randomly changed graphic receiving interface; a receiving module configured to receive a touch graphic input by a user by touching through the graphic receiving interface; and a locking and unlocking module configured to perform a locking or unlocking operation according to the touch graphic.

By using the method and device for locking and unlocking with a touch graphic according to embodiments of the present invention, when a user performs locking or unlocking with a touch graphic, an electronic device having a touch screen provides a randomly changed graphic receiving interface to the user; a touch graphic input by the user every time through the graphic receiving interface is located in a different position. There is an extremely small probability that a touch graphic formed by a track on the touch screen is the same as the touch graphic that is set when the locking is performed, thereby improving security of locking or unlocking.

The present invention further provides a method for locking and unlocking with a touch graphic, including: outputting a graphic receiving interface; receiving a touch graphic input by a user by touching through the graphic receiving interface; outputting a random path crossing the touch graphic on the graphic receiving interface; outputting first prompt information, where the first prompt information is used to prompt the user to perform a touch operation along the random path; and after receiving a touch signal generated when the user performs the touch operation along the random path, performing a locking or unlocking operation according to the touch graphic.

The present invention further provides a device for locking and unlocking with a touch graphic, including: an interface outputting module configured to output a randomly changed graphic receiving interface; a receiving module configured to receive a touch graphic input by a user by touching through the graphic receiving interface; a path outputting module configured to output a random path crossing the touch graphic on the graphic receiving interface; a first prompting module configured to output first prompt information, where the first prompt information is used to prompt the user to perform a touch operation along the random path; and a locking and unlocking module configured to perform a locking or unlocking operation according to the touch graphic after receiving a touch signal generated when the user performs the touch operation along the random path.

By using the method and device for locking and unlocking with a touch graphic according to embodiments of the present invention, when a user performs locking or unlocking with a touch graphic, an electronic device having a touch screen provides a graphic receiving interface having fixed connection points to the user; then, after the user inputs a touch graphic, the electronic device outputs a random path having common points with the touch graphic on the graphic receiving interface to the user, and prompts the user to perform a touch operation along the random path on the touch screen. The electronic device performs a locking or unlocking operation only after receiving a touch signal generated when the user follows the random path to perform the touch operation on the touch screen, thereby forcing the user to remove the track left on the touch screen when the user inputs the touch graphic, and improving security of locking or unlocking with the touch graphic.

The present invention further provides a method for locking and unlocking with a touch graphic, including: outputting a graphic receiving interface; receiving a touch graphic input by a user by touching through the graphic receiving interface; outputting a random animation traversing the graphic receiving interface on the graphic receiving interface; outputting second prompt information, where the second prompt information is used to prompt the user to perform a touch operation following the random animation when the random animation is played; and after receiving a touch signal generated when the user performs the touch operation following the random animation, performing a locking or unlocking operation according to the touch graphic.

The present invention further provides a device for locking and unlocking with a touch graphic, including: an interface outputting module configured to output a randomly changed graphic receiving interface; a receiving module configured to receive a touch graphic input by a user by touching through the graphic receiving interface; an animation playing module configured to output a random animation traversing the graphic receiving interface on the graphic receiving interface; a second prompting module configured to output second prompt information, where the second prompt information is used to prompt the user to perform a touch operation following the random animation when the random animation is played; and a locking and unlocking module configured to perform a locking or unlocking operation according to the touch graphic after receiving a touch signal generated when the user performs the touch operation following the random animation.

By using the method and device for locking and unlocking with a touch graphic according to embodiments of the present invention, when a user performs locking or unlocking with a touch graphic, an electronic device having a touch screen provides a graphic receiving interface having fixed connection points to the user; after the user inputs a touch graphic, the electronic device outputs a random animation traversing the graphic receiving interface to the user on the graphic receiving interface, and prompts the user to perform a touch operation following the animation when the random animation is played. The electronic device performs a locking or unlocking operation only after receiving a touch signal generated when the user performs the touch operation following the random animation on the touch screen, thereby forcing the user to remove the track left on the touch screen when the user inputs the touch graphic, and improving security of locking or unlocking with the touch graphic.

The present invention further provides a method for locking and unlocking with a touch graphic, including: outputting a graphic receiving interface; receiving a touch graphic input by a user by touching through the graphic receiving interface; outputting third prompt information to prompt the user to wipe off a track of the touch graphic on the touch screen; and after receiving a touch signal generated when the user wipes off the track of the touch graphic on the touch screen, performing a locking or unlocking operation according to the touch graphic.

The present invention further provides a device for locking and unlocking with a touch graphic, including: an interface outputting module configured to output a randomly changed graphic receiving interface; a receiving module configured to receive a touch graphic input by a user by touching through the graphic receiving interface; a third prompting module configured to output third prompt information to prompt the user to wipe off a track of the touch graphic on the touch screen; and a locking and unlocking module configured to perform a locking or unlocking operation according to the touch graphic after receiving a touch signal generated when the user wipes off the track of the touch graphic on the touch screen.

By using the method and device for locking and unlocking with a touch graphic according to embodiments of the present invention, when a user performs locking or unlocking with a touch graphic, an electronic device having a touch screen provides a graphic receiving interface having fixed connection points to the user; then, after the user inputs a touch graphic, the electronic device outputs third prompt information on the graphic receiving interface to prompt the user to actively wipe off a track of the touch graphic on the touch screen. The electronic device performs a locking or unlocking operation only after receiving a touch signal generated when the user performs a touch operation on the touch screen, thereby forcing the user to remove the track left on the touch screen when the user inputs the touch graphic, and improving security of locking or unlocking with the touch graphic.

BRIEF DESCRIPTION OF THE DRAWINGS

To illustrate the technical solutions according to the embodiments of the present invention or in the prior art more clearly, accompanying drawings required for describing the embodiments or the prior art are introduced briefly below. Apparently, the accompanying drawings in the following description are merely some embodiments of the present invention, and persons of ordinary skill in the art may further obtain other drawings according to the accompanying drawings without creative efforts.

DETAILED DESCRIPTION

To make the objectives, technical solutions, and advantages of the embodiments of the present invention clearer, the technical solutions provided by the embodiments of the present invention are hereinafter described clearly and completely with reference to the accompanying drawings. Evidently, the described embodiments are only some exemplary embodiments of the present invention, rather than all embodiments of the present invention. All the other embodiments obtained by persons of ordinary skill in the art without creative efforts based on the embodiments of the present invention shall fall within the protection scope of the present invention.

Figure 1A:
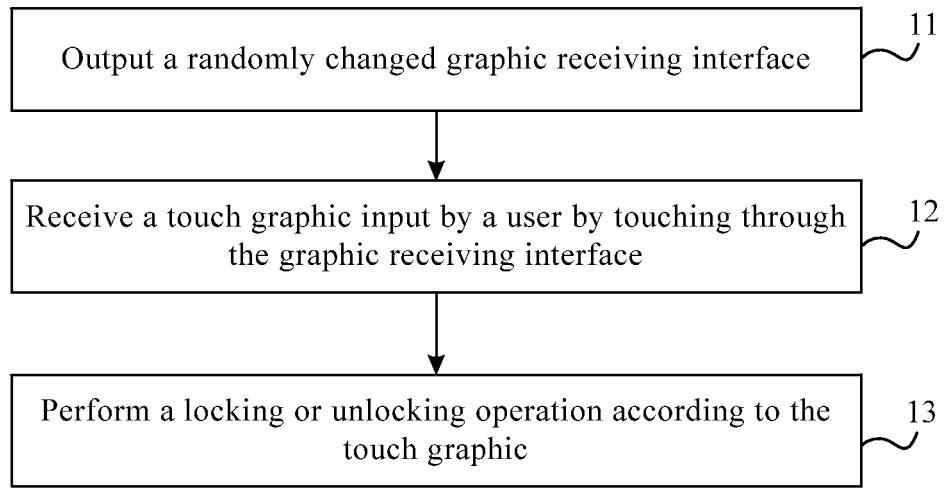
FIG. 1A is a flowchart of a method for locking and unlocking with a touch graphic according to a first embodiment of the present invention.

FIG. 1A is a flowchart of a method for locking and unlocking with a touch graphic according to a first embodiment of the present invention. An execution entity in this embodiment may be an electronic device having a touch screen or a central processing unit (CPU) in the electronic device, where the electronic device having a touch screen may be an electronic device such as a mobile phone having a touch screen, a notebook computer having a touch screen, or a digital camera having a touch screen. As shown in FIG. 1A, the method for locking and unlocking with a touch graphic according to this embodiment includes:

Step 11: Output a randomly changed graphic receiving interface.

Normally, a graphic receiving interface is provided with multiple points. A user connects the multiple points on the graphic receiving interface by touching to form a touch graphic. The multiple points on the graphic receiving interface may be arranged in a form of a nine-square grid. That is, nine points are arranged in three rows with three points in each row. Certainly, the multiple points on the graphic receiving interface may also be arranged in other forms, and the number of points may be set according to requirements.

Before outputting a graphic receiving interface to a user through a touch screen, an electronic device randomly changes the graphic receiving interface first. For example, a coordinate direction of the graphic receiving interface or positions arranged for the multiple points provided on the graphic receiving interface are randomly changed, or the coordinate direction of the graphic receiving interface and the positions arranged for the multiple points are randomly changed at the same time. Because the graphic receiving interface is randomly changed, a position and/or a direction in which the user inputs a touch graphic varies with the graphic receiving interface. There is a very small probability that a touch graphic previously input through a graphic receiving interface coincides with a touch graphic required by a current graphic receiving interface.

Step 12: Receive a touch graphic input by a user by touching through the graphic receiving interface.

When locking encrypted information or a touch screen, the user inputs a touch graphic through a graphic receiving interface provided by the electronic device. After receiving the touch graphic, the electronic device stores the touch graphic input by the user and sets it as a touch graphic for verifying a user identity. When the user needs to use the encrypted information in the electronic device or open the touch screen, the user inputs, through the graphic receiving interface provided by the electronic device, the touch graphic set when performing locking so as to request the electronic device to verify the user identity.

A track is formed on the surface of the touch screen after the user connects multiple points on the touch screen to form the touch graphic by touching. Therefore, another user may decrypt the touch graphic according to the path and direction of the track on the touch screen, resulting in insecurity of the encrypted information. To avoid a case in which the touch track may cause a graphic for locking to be exposed, in step 11, every time the user performs locking or unlocking, the electronic device randomly changes the graphic receiving interface output to the user. For example, the coordinate direction of the graphic receiving interface is randomly changed, and/or positions arranged for the multiple points on the graphic receiving interface are randomly changed.

Step 13: Perform a locking or unlocking operation according to the touch graphic.

In a process of locking encrypted information or locking the touch screen, after receiving the touch graphic input by the user through the graphic receiving interface, the electronic device stores the touch graphic and locks the encrypted information or the touch screen according to the touch graphic. In a process of unlocking the encrypted information or unlocking the touch screen, after receiving a touch graphic input by the user through the graphic receiving interface, the electronic device verifies the touch graphic input by the user against the stored touch graphic; if the two are identical, the user passes identity verification, that is, unlocking is successful, and the user may use the encrypted information or the touch screen as normal.

By using the method for locking and unlocking with a touch graphic according to the embodiment of the present invention, when a user performs locking or unlocking with a touch graphic, an electronic device having a touch screen provides a randomly changed graphic receiving interface to the user; a touch graphic input by the user every time through the graphic receiving interface is located in a different position. There is an extremely small probability that a touch graphic formed according to a track on the touch screen is the same as the touch graphic that is set when the locking is performed, thereby improving security of locking or unlocking. A track may be left on the touch screen because the user needs to form the touch graphic on the touch screen by touching in a locking and unlocking process; the above method prevents an illegal user from decrypting the touch graphic set during locking or from decrypting the touch graphic input during unlocking according to the track on the touch screen. Therefore, the technical solution provided by this embodiment is capable of improving security in a process of locking with a touch graphic and improving security in an unlocking process.

To further improve the security in locking or unlocking with a touch graphic, in other embodiments, the user may be forced to remove or destroy a track left on a touch screen. For example, between step 12 and step 13, the electronic device may further output third prompt information on the graphic receiving interface to prompt the user to actively wipe off a track formed on the touch screen when connecting multiple points to form a touch graphic; and after receiving a touch signal generated when the user wipes off the track of the touch graphic on the touch screen, the electronic device performs a locking or unlocking operation according to the touch graphic; or the electronic device may use other methods to instruct the user to wipe off the track on the touch screen, and the electronic device performs the locking or unlocking operation only after the user performs a touch operation as instructed.

Figure 1B:
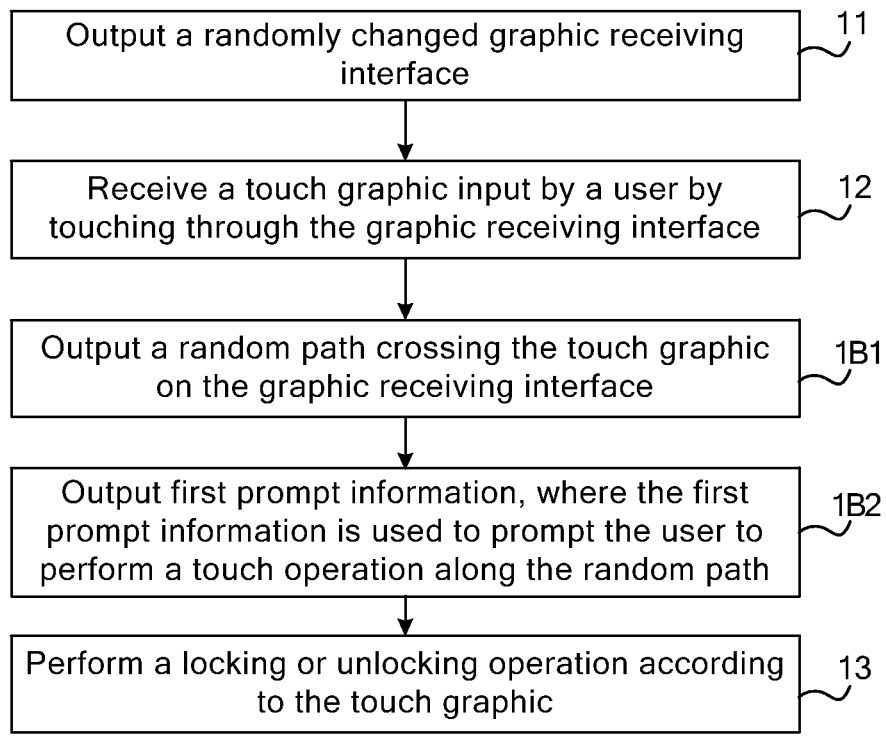
FIG. 1B is a flowchart of a method for locking and unlocking with a touch graphic according to a second embodiment of the present invention.

A second embodiment of the present invention provides a method for forcing a user to remove or destroy a track left on a touch screen. The method for forcing a user to remove or destroy a track left on a touch screen may be applied between step 12 and step 13 in the above embodiment. As shown in FIG. 1B, the method for forcing a user to remove or destroy a track left on a touch screen includes:

Step 1B1: Output a random path crossing the touch graphic on the graphic receiving interface.

Step 1B2: Output first prompt information, where the first prompt information is used to prompt the user to perform a touch operation along the random path.

Before step 13 of performing a locking or unlocking operation according to the touch graphic, the electronic device outputs a random path on the graphic receiving interface, and outputs first prompt information to prompt the user to perform a touch operation along the random path. Because the random path crosses the touch graphic, after the user performs the touch operation along the random path on the touch screen, the track left on the touch screen when the touch graphic is input may be removed or destroyed. After the user performs the touch operation along the random path on the touch screen according to the first prompt information, the electronic device executes step 13.

Figure 1C:
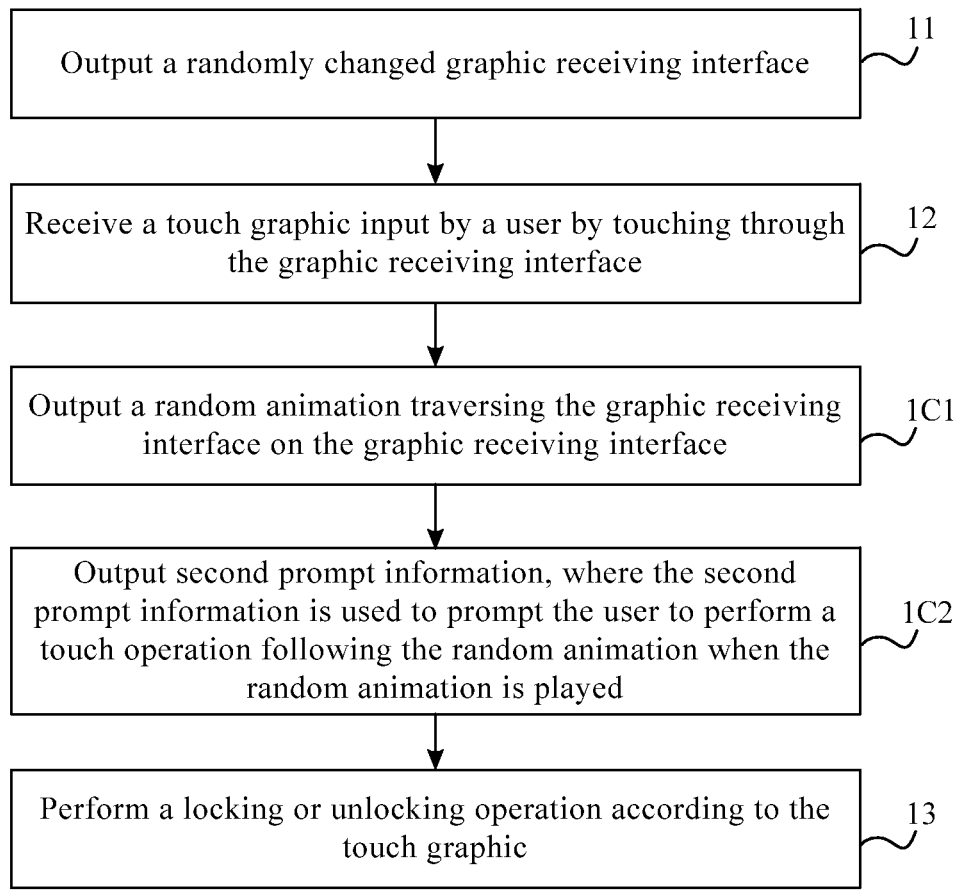
FIG. 1C is a flowchart of a method for locking and unlocking with a touch graphic according to a third embodiment of the present invention.

A third embodiment of the present invention provides another method for forcing a user to remove or destroy a track left on a touch screen. The method for forcing a user to remove or destroy a track left on a touch screen may be applied between step 12 and step 13 in the above embodiment. As shown in FIG. 1C, the method for forcing a user to remove or destroy a track left on a touch screen includes:

Step 1C1: Output a random animation traversing the graphic receiving interface on the graphic receiving interface.

Step 1C2: Output second prompt information, where the second prompt information is used to prompt the user to perform a touch operation following the random animation when the random animation is played.

A difference between FIG. 1C and FIG. 1B lies in that, in FIG. 1B, after a random path is output on the graphic receiving interface, the random path is static, while in FIG. 1C, a random animation output on the graphic receiving interface is played. Because the random animation traverses the graphic receiving interface, when the user slides with a finger on the graphic receiving interface on the touch screen following the random animation, the track left on the touch screen when the multiple points are connected to form the touch graphic may be removed or destroyed. After the user performs sliding with a finger on the graphic receiving interface on the touch screen following the random animation according to the second prompt information, the electronic device executes step 13.

By using the method for locking and unlocking with a touch graphic according to the embodiment of the present invention, when a user performs locking or unlocking with a touch graphic, an electronic device having a touch screen provides a randomly changed graphic receiving interface to the user; a touch graphic input by the user every time through the graphic receiving interface is located in a different position and/or direction. As a result, there is an extremely small probability that a touch graphic formed by a track on the touch screen is the same as the touch graphic that is set when the locking is performed, thereby improving security of locking or unlocking. Further, after the user inputs the touch graphic, the electronic device may also output a random path or a random animation to the user on the graphic receiving interface, and prompt the user to perform a touch operation along the random path or following the random animation on the touch screen, thereby removing or destroying the track left on the touch screen when the touch graphic is input, and further avoiding revealing the formed touch graphic by the track on the touch screen.

Figure 2A:
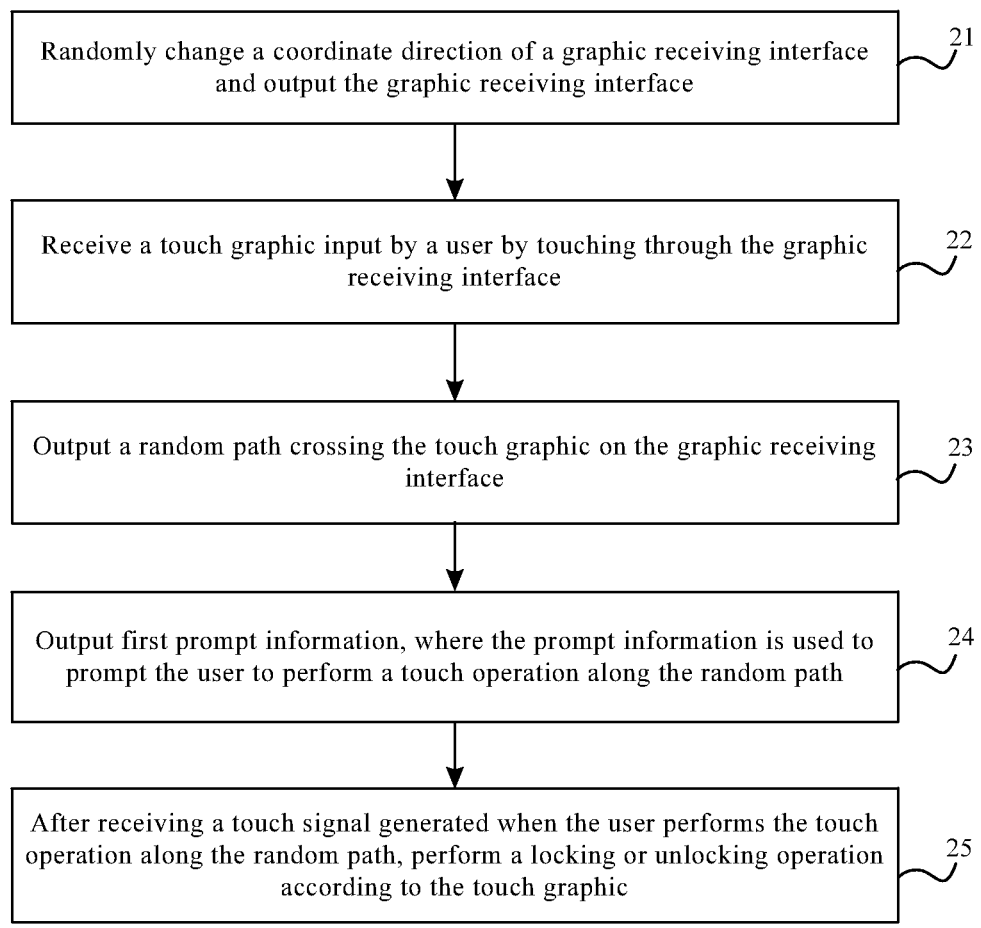
FIG. 2A is a flowchart of a method for locking and unlocking with a touch graphic according to a fourth embodiment of the present invention.
Figure 2B:
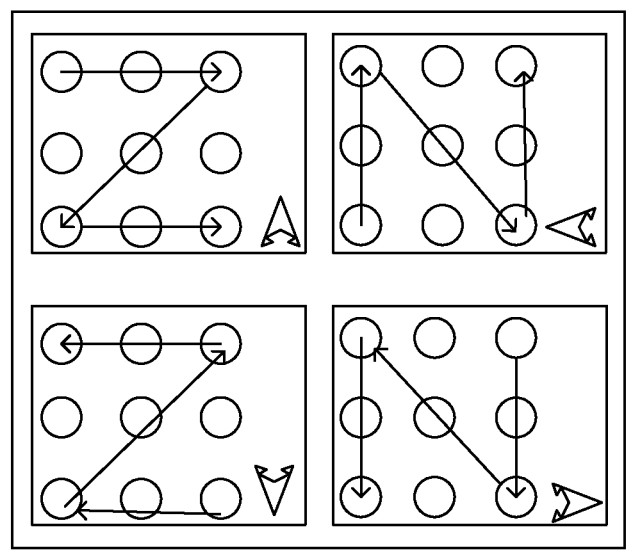
FIG. 2B is a schematic diagram of a graphic receiving interface in the method for locking and unlocking with a touch graphic according to the fourth embodiment of the present invention.
Figure 2C:
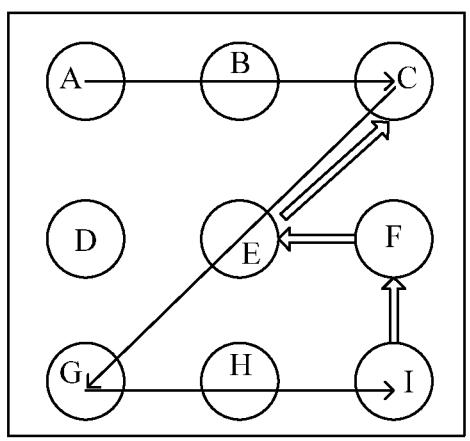
FIG. 2C is another schematic diagram of the graphic receiving interface in the method for locking and unlocking with a touch graphic according to the fourth embodiment of the present invention.
Figure 2D:
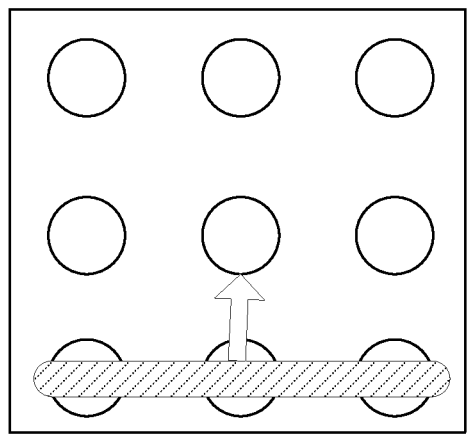
FIG. 2D is another schematic diagram of the graphic receiving interface in the method for locking and unlocking with a touch graphic according to the fourth embodiment of the present invention.

FIG. 2A is a flowchart of a method for locking and unlocking with a touch graphic according to a fourth embodiment of the present invention; FIG. 2B is a schematic diagram of a graphic receiving interface in the method for locking and unlocking with a touch graphic according to the fourth embodiment of the present invention; FIG. 2C is another schematic diagram of the graphic receiving interface in the method for locking and unlocking with a touch graphic according to the fourth embodiment of the present invention; and FIG. 2D is another schematic diagram of the graphic receiving interface in the method for locking and unlocking with a touch graphic according to the fourth embodiment of the present invention. The processes of locking and unlocking with a touch graphic are basically similar. In this embodiment, the unlocking process is performed as an example to describe how to improve security; operations in the locking process are similar and will not be described repeatedly herein. As shown in FIG. 2A, the method for locking and unlocking with a touch graphic according to this embodiment includes:

Step 21: Randomly change a coordinate direction of a graphic receiving interface and output the graphic receiving interface.

After the coordinate direction of the graphic receiving interface is changed, a direction of a touch graphic formed by points on the graphic receiving interface also changes accordingly. For example, a "positive direction" indication is randomly generated every time locking or unlocking is performed. As shown in FIG. 2B, an arrow direction in the lower right corner of the graphic receiving interface prompts a user which direction is a "positive direction," where a direction indicated by the arrow may be set as the "positive direction." In an unlocking process, a touch graphic may be the same as that formed by connecting during locking only if the user connects the points according to the "positive direction." Therefore, in cases where the coordinate direction of the graphic receiving interface is changed randomly, there is a very small probability that a touch graphic formed by connecting points according to a track left on the touch screen is the same as the touch graphic set in advance during locking.

Step 22: Receive a touch graphic input by a user by touching through the graphic receiving interface.

Step 23: Output a random path crossing the touch graphic on the graphic receiving interface.

An electronic device outputs a random path crossing the touch graphic input in step 22 on the graphic receiving interface. Crossing herein may be that the random path has one or more common points with the touch graphic input in step 22.

Step 24: Output first prompt information, where the first prompt information is used to prompt the user to perform a touch operation along the random path.

The electronic device outputs first prompt information on the graphic receiving interface to prompt the user to perform a touch operation along the random path.

Some points on the random path indicated by the graphic receiving interface overlap some connection points forming the touch graphic; therefore, after the user performs the touch operation along the random path on the touch screen, the track left when the user connects the multiple points to form the touch graphic may be removed. In addition, the random path output by the graphic receiving interface is randomly changed; therefore, every time after the user connects the multiple points to form the touch graphic, there is a very small probability that the random paths for performing the remove operation are the same, thereby effectively avoiding a problem of information insecurity resulting from unlocking by connecting the multiple points to form the touch graphic according to the track on the touch screen.

As shown in FIG. 2C, after a user connects a touch graphic of a letter "Z" along thin arrows, an unlocking track A->B->C->E->G->H->I is formed; then, four points C, E, F, and I are highlighted on the graphic receiving interface as a random path; at the same time, prompt information is output to prompt the user to continue to connect the four points along the thick arrows to complete the unlocking operation. Three points (C, E, and I) of the four highlighted points on the graphic receiving interface overlap three points (C, E, and I) on the "Z" touch graphic. That is, the three points C, E, and I are common points of the touch graphic and the random path. The user continues to connect the four points along the thick arrows to form a new unlocking track I->F->E->C, where the new unlocking track (I->F->E->C) and the original unlocking track (A->B->C->E->G->H->I) form a final unlocking track (A-B-C-E-F-I-H-G-E or A-B-C-E-G-H-I-F-E), thereby destroying the original unlocking track. Because the four highlighted points on the graphic receiving interface are randomly generated by a central processing unit and are changed every time the user performs locking or unlocking, the security is improved.

In step 23, in addition to the random path having common points with the touch graphic connected by the user, a random animation traversing the graphic receiving interface may also be output. As shown in FIG. 2D, after the user connects the multiple points to form the touch graphic, a step is added before the electronic device performs locking or unlocking (before step 25), that is: Play a random animation on the graphic receiving interface and output prompt information to prompt the user to touch the random animation on the touch screen with a finger and slide as the random animation is played. After playing of the random animation is completed, a locking or unlocking operation in step 25 is performed. The added step and steps 23 and 24 may coexist, and the sequence thereof is not limited; or steps 23 and 24 in this embodiment may be replaced with the added step. The user may be forced to wipe the touch screen in modes shown in FIG. 2C and FIG. 2D, thereby removing or destroying the track left on the touch screen when the user connects the multiple points to form the touch graphic.

Step 25: After receiving a touch signal generated when the user performs the touch operation along the random path, perform a locking or unlocking operation according to the touch graphic.

After the electronic device outputs the first prompt information, if the touch signal generated when the user performs the touch operation along the random path is received, indicating that the track left on the touch screen when the multiple points are connected to form the touch graphic in step 22 has been removed or destroyed, the electronic device performs a locking or unlocking operation according to the touch graphic input in step 22.

Figure 3A:
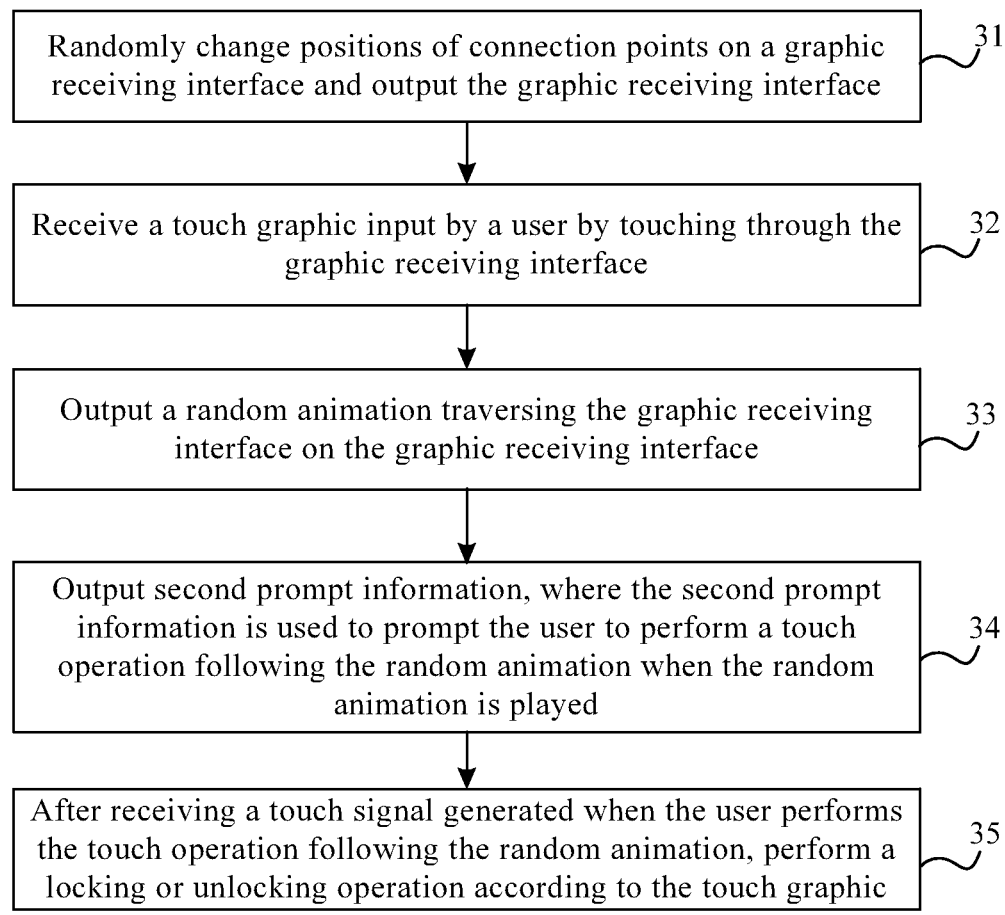
FIG. 3A is a flowchart of a method for locking and unlocking with a touch graphic according to a fifth embodiment of the present invention.

By using the method for locking and unlocking with a touch graphic according to the embodiment of the present invention, when a user performs locking or unlocking with a touch graphic, an electronic device having a touch screen provides a graphic receiving interface having a randomly changed coordinate direction to the user; a touch graphic input by the user every time through the graphic receiving interface is in a different direction, so that there is an extremely small probability that a touch graphic formed by a track on the touch screen is the same as the touch graphic that is set when the locking is performed, thereby improving security of locking or unlocking. Further, after the user inputs the touch graphic, the electronic device may also output a random path having common points with the touch graphic on the graphic receiving interface to the user, and prompt the user to perform a touch operation along the random path on the touch screen; the electronic device performs the locking or unlocking operation only after receiving a touch signal generated when the user performs the touch operation along the random path on the touch screen, thereby forcing the user to remove the track left on the touch screen when the touch graphic is input, and further improving security of locking or unlocking with the touch graphic. In addition, the random path may be replaced with a random animation, and the user is prompted to touch the random animation on the touch screen with a finger and slide as the random animation is played, so that the electronic device performs the locking or unlocking operation only after receiving a touch signal generated when the user performs the touch operation on the touch screen following the random animation, thereby forcing the user to remove the track left on the touch screen when the touch graphic is input, and further improving security of locking or unlocking with the touch graphic. FIG. 3A is a flowchart of a method for locking and unlocking with a touch graphic according to a fifth embodiment of the present invention, and FIG. 3B is a schematic diagram of a graphic receiving interface in the method for unlocking with a touch graphic according to the fifth embodiment of the present invention.

Step 31: Randomly change positions of connection points on a graphic receiving interface and output the graphic receiving interface.

Figure 3B:
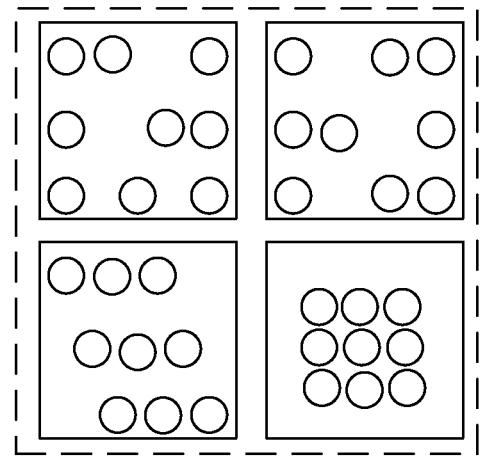
FIG. 3B is a schematic diagram of a graphic receiving interface in the method for locking and unlocking with a touch graphic according to the fifth embodiment of the present invention.

As shown in FIG. 3B, every time a graphic receiving interface is generated, relative positions of nine points on the graphic receiving interface are randomly changed, so that the track every time the user draws will not give a clue. In addition, the sequence of the nine points is not changed, and only the positions thereof are changed. Therefore, the track drawn every time by the user changes greatly and tracks drawn multiple times intersect each other and cannot be identified, and no track gives a tip about the touch graphic.

Step 32: Receive a touch graphic input by a user by touching through the graphic receiving interface.

Step 33: Output a random animation traversing the graphic receiving interface on the graphic receiving interface.

The electronic device outputs a random animation traversing the graphic receiving interface on the graphic receiving interface.

Step 34: Output second prompt information, where the second prompt information is used to prompt the user to perform a touch operation following the random animation when the random animation is played.

The electronic device outputs second prompt information on the graphic receiving interface to prompt the user to perform a touch operation following a random animation when the random animation is played.

After the user connects the multiple points to form the touch graphic and before the electronic device performs locking or unlocking (before step 35), the electronic device may play a random animation and prompt the user to touch the random animation with a finger and slide as the random animation is played. After playing of the random animation is completed, a locking or unlocking operation in step 35 is performed. Certainly, the above steps 33 and 34 may be replaced with outputting a random path having common points with the touch graphic on the graphic receiving interface, and prompting the user to perform a touch operation along the random path on the touch screen. The user may be forced to wipe the touch screen by using the above modes, thereby removing or destroying the track left on the touch screen when the user connects the multiple points to form the touch graphic.

Step 35: After receiving a touch signal generated when the user performs the touch operation following the random animation, perform a locking or unlocking operation according to the touch graphic.

After the electronic device outputs the second prompt information, if a touch signal generated when the user performs the touch operation following the random animation is received, indicating that the track left on the touch screen when the multiple points are connected to form the touch graphic in step 32 has been removed or destroyed, the electronic device performs a locking or unlocking operation according to the touch graphic input in step 32.

By using the method for locking and unlocking with a touch graphic according to the embodiment of the present invention, when a user performs locking or unlocking with a touch graphic, an electronic device having a touch screen provides a graphic receiving interface having connection points in randomly changed positions to the user; a touch graphic input by the user every time through the graphic receiving interface is located in a different position, so that there is an extremely small probability that a touch graphic formed by a track on the touch screen is the same as the touch graphic that is set when the locking is performed, thereby improving security of locking or unlocking. Further, after the user inputs the touch graphic, the electronic device may also output a random animation traversing the graphic receiving interface on the graphic receiving interface to the user, and prompt the user to perform a touch operation following the random animation when the random animation is played. The electronic device performs a locking or unlocking operation only after receiving a touch signal generated when the user performs the touch operation following the random animation when the random animation is played, thereby forcing the user to remove the track left on the touch screen when the user inputs the touch graphic, and improving security of locking or unlocking with the touch graphic. In addition, the above random animation may also be replaced with a random path, and the user performs the touch operation along the random path on the touch screen, so that the electronic device performs the locking or unlocking operation after receiving a touch signal generated when the user performs the touch operation along the random path on the touch screen, thereby forcing the user to remove the track left on the touch screen when the touch graphic is input, and further improving security of locking or unlocking with the touch graphic.

Figure 10A:
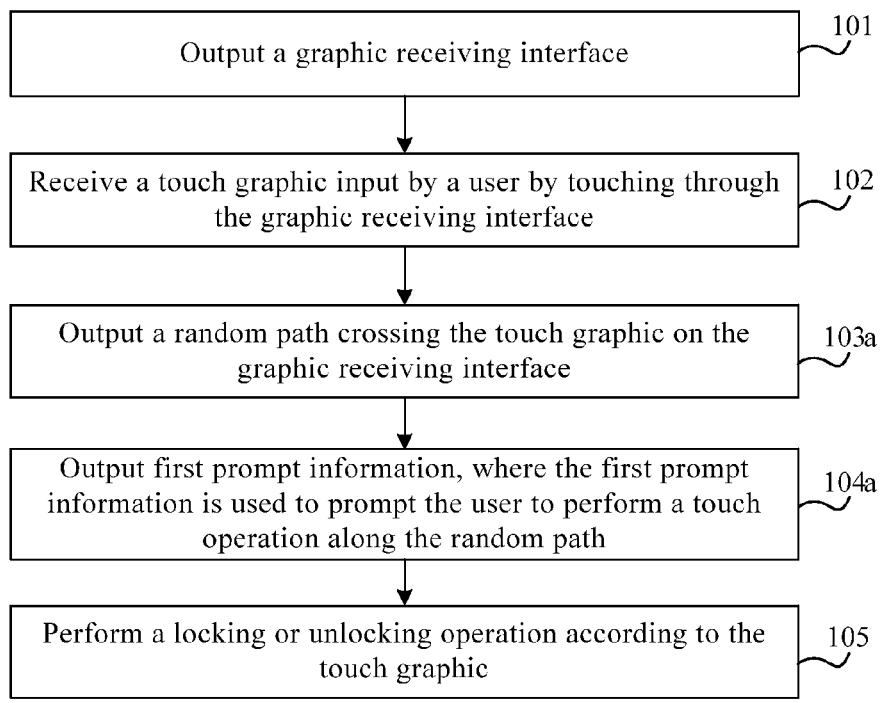
FIG. 10A is a flowchart of a method for locking and unlocking with a touch graphic according to a sixth embodiment of the present invention.

In other embodiments, the method for locking and unlocking with a touch graphic according to embodiments of the present invention may not disturb a track by outputting a randomly changed graphic receiving interface, but disturb the track by using a random path and/or a random animation, thereby improving security of locking or unlocking. Specifically, as shown in FIG. 10A, a method for locking and unlocking with a touch graphic according to a sixth embodiment of the present invention includes:

Step 101: Output a graphic receiving interface, where the graphic receiving interface is normally provided with multiple touch points, and a user connects the multiple touch points on the graphic receiving interface by touching to form a touch graphic. Positions and coordinate directions of the multiple touch points on the graphic receiving interface are fixed here.

Step 102: Receive the touch graphic input by the user by touching through the graphic receiving interface. For step 102, reference may be made to the specific implementation of other embodiments, such as step 12, step 22, and step 32, and the details will not be described repeatedly herein.

In step 102, when locking encrypted information or the touch screen, the user inputs a touch graphic through the graphic receiving interface provided by the electronic device. After receiving the touch graphic, the electronic device stores the touch graphic input by the user and sets it as the touch graphic for verifying a user identity. When the user needs to use the encrypted information in the electronic device or open the touch screen, the user inputs the touch graphic set when performing locking through the graphic receiving interface provided by the electronic device, so as to request the electronic device to verify the user identity.

Step 103a: Output a random path crossing the touch graphic on the graphic receiving interface. For step 103a, reference may be made to the specific implementation of other embodiments, such as step 1B1 and step 23, and the details will not be described repeatedly herein.

Step 104a: Output first prompt information, where the first prompt information is used to prompt the user to perform a touch operation along the random path. For step 104a, reference may be made to the specific implementation of other embodiments, such as step 1B2 and step 24, and the details will not be described repeatedly herein.

Step 105: Perform a locking or unlocking operation according to the touch graphic. For step 105, reference may be made to the specific implementation of other embodiments, such as step 13, step 25, and step 35, and the details will not be described repeatedly herein.

In step 105, after a touch signal generated when the user performs the touch operation along the random path is received, a locking or unlocking operation is performed according to the touch graphic.

Figure 10B:
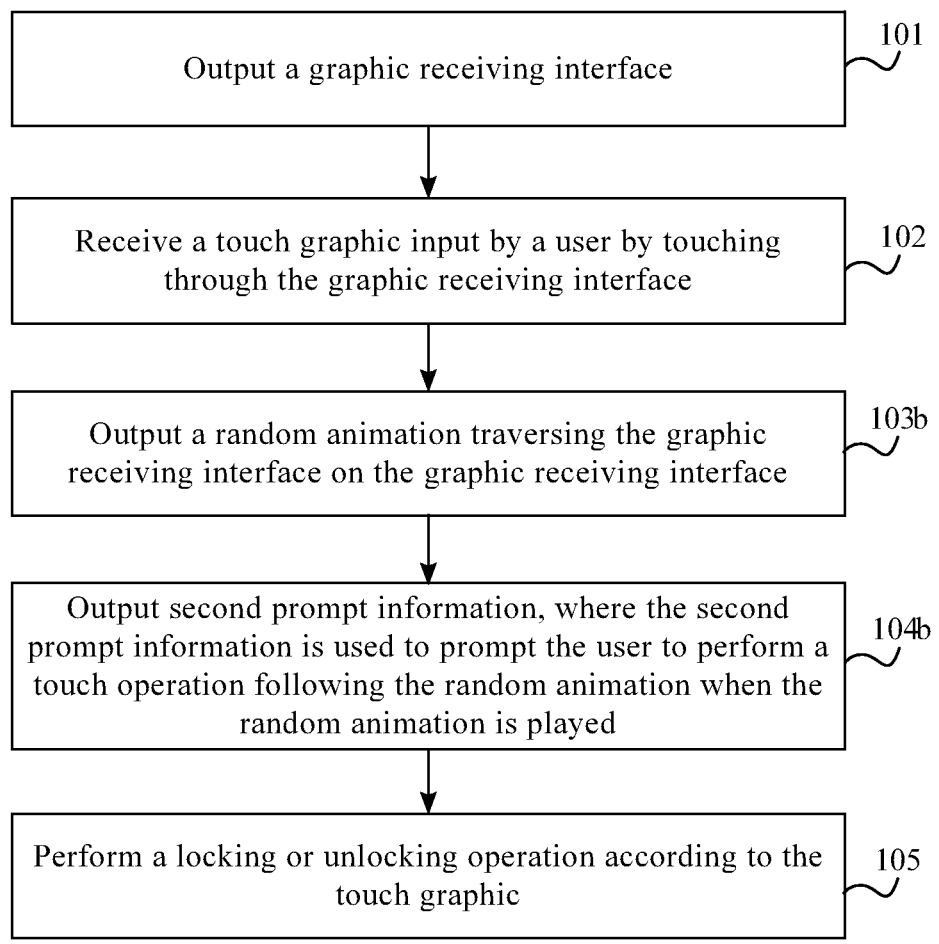
FIG. 10B is a flowchart of a method for locking and unlocking with a touch graphic according to a seventh embodiment of the present invention.

In addition, as shown in FIG. 10B, steps 103a and 104a may be replaced with steps 103b and 104b. Step 103b: Output a random animation traversing the graphic receiving interface on the graphic receiving interface. Step 104b: Output second prompt information, where the second prompt information is used to prompt the user to perform a touch operation following the random animation when the random animation is played. For step 103b, reference may be made to the specific implementation of other embodiments, such as step 1C1 and step 33, and the details will not be described repeatedly herein. For step 104b, reference may be made to the specific implementation of other embodiments, such as step 1C2 and step 34, and the details will not be described repeatedly herein. In such cases, in step 105, after a touch signal generated when the user performs the touch operation following the random animation is received, a locking or unlocking operation is performed according to the touch graphic.

Figure 10C:
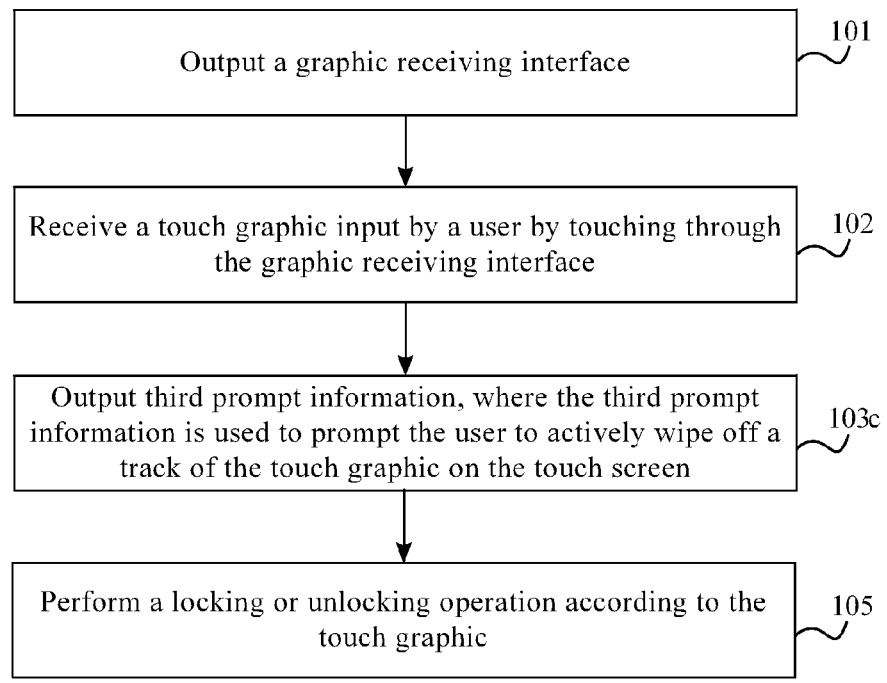
FIG. 10C is a flowchart of a method for locking and unlocking with a touch graphic according to an eighth embodiment of the present invention.

Or as shown in FIG. 10C, steps 103a and 104a may also be replaced with step 103c: Output third prompt information, where the third prompt information is used to prompt the user to actively wipe off a track of the touch graphic on the touch screen. In such cases, in step 105, a locking or unlocking operation is performed according to the touch graphic after a touch signal generated when the user wipes off the track of the touch graphic on the touch screen is received.

Certainly, in other embodiments, steps 103a and 104a and steps 103b and 104b may coexist, and the sequence thereof is not limited. Further, in step 102, if there is fourth prompt information for prompting the user to input the touch graphic for locking and unlocking on the graphic receiving interface by touching, because step 102, steps 103a and 104a, and steps 103b and 104b are respectively provided with prompt information, the user will not be confused with the content to be input in various steps. Therefore, the sequence of step 102, steps 103a and 104a, and steps 103b and 104b is not limited.

By using the method for locking and unlocking with a touch graphic according to embodiments of the present invention, when a user performs locking or unlocking with a touch graphic, an electronic device having a touch screen outputs a graphic receiving interface having fixed connection points to the user; after the user inputs a touch graphic, the electronic device may further output a random animation traversing the graphic receiving interface on the graphic receiving interface to the user, and prompt the user to perform a touch operation following the random animation when the random animation is played; and/or the electronic device outputs a random path having common points with the touch graphic on the graphic receiving interface to the user, and prompts the user to perform a touch operation along the random path on the touch screen; and/or the electronic device outputs third prompt information to prompt the user to actively wipe off a track of the touch graphic on the touch screen; the electronic device performs a locking and unlocking operation only after receiving a touch signal generated when the user performs the touch operation following the random animation, along the random path, or following the third prompt information, thereby forcing the user to remove the track left on the touch screen when the touch graphic is input, and improving security of locking or unlocking with the touch graphic.

Figure 4:
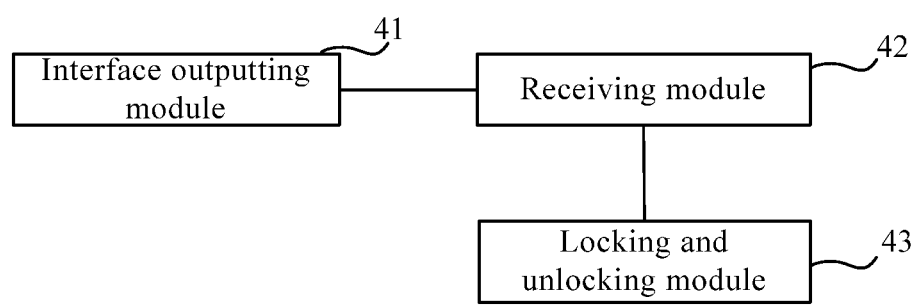
FIG. 4 is a schematic structural diagram of a device for locking and unlocking with a touch graphic according to the first embodiment of the present invention.

FIG. 4 is a schematic structural diagram of a device for locking and unlocking with a touch graphic according to the first embodiment of the present invention. As shown in FIG. 4, this embodiment includes an interface outputting module 41, a receiving module 42, and a locking and unlocking module 43.

The interface outputting module 41 is configured to output a randomly changed graphic receiving interface.

The receiving module 42 is configured to receive a touch graphic input by a user by touching through the graphic receiving interface output by the interface outputting module 41.

The locking and unlocking module 43 is configured to perform a locking or unlocking operation according to the touch graphic received by the receiving module 42.

Reference may be made to the description in the embodiment corresponding to FIG. 1A for specific operation of the above modules and no repeated description will be provided herein.

By using the device for locking and unlocking with a touch graphic according to the embodiment of the present invention, when a user performs locking or unlocking with a touch graphic, the interface outputting module 41 provides a randomly changed graphic receiving interface to the user; a touch graphic input by the user every time through the graphic receiving interface is located in a different position and/or direction. There is an extremely small probability that a touch graphic formed by a track on the touch screen is the same as the touch graphic that is set when the locking is performed, thereby improving security of locking or unlocking.

Figure 5:
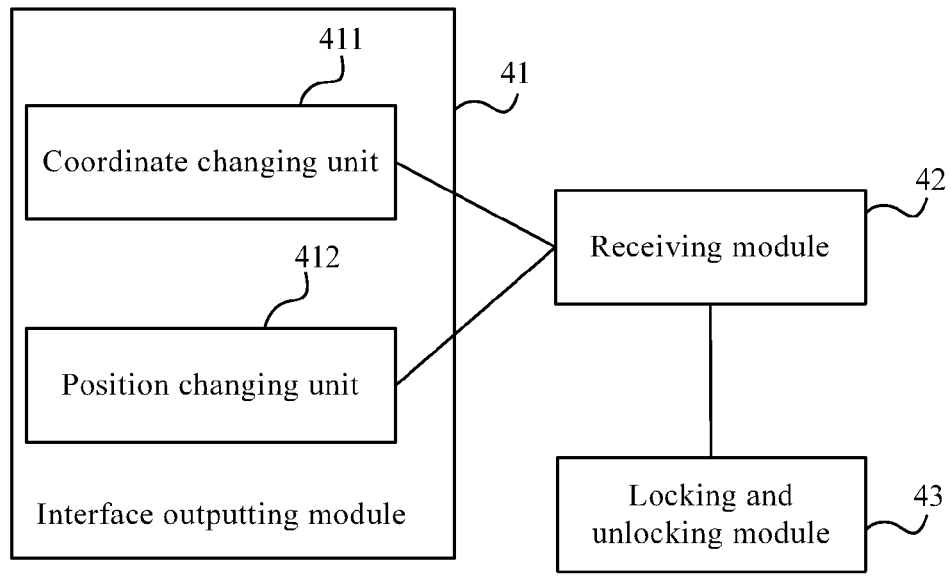
FIG. 5 is a schematic structural diagram of a device for locking and unlocking with a touch graphic according to the second embodiment of the present invention.

FIG. 5 is a schematic structural diagram of a device for locking and unlocking with a touch graphic according to the second embodiment of the present invention. As shown in FIG. 5, the interface outputting module 41 includes a coordinate changing unit 411 and/or a position changing unit 412.

The coordinate changing unit 411 is configured to randomly change a coordinate direction of a graphic receiving interface output by the interface outputting module 41 and output the graphic receiving interface. Reference may be made to the description in the embodiment corresponding to FIG. 2A for an operating principle of the coordinate changing unit 411 and no repeated description will be provided herein.

The position changing unit 412 is configured to randomly change positions of connection points on the graphic receiving interface output by the interface outputting module 41 and output the graphic receiving interface. Reference may be made to the description in the embodiment corresponding to FIG. 3A for an operating principle of the position changing unit 412 and no repeated description will be provided herein.

By using the device for locking and unlocking with a touch graphic according to the embodiment of the present invention, when a user performs locking or unlocking with a touch graphic, the interface outputting module 41 provides a randomly changed graphic receiving interface to the user; a touch graphic input by the user every time through the graphic receiving interface is located in a different position and/or direction. There is an extremely small probability that a touch graphic formed by a track on the touch screen is the same as the touch graphic that is set when the locking is performed, thereby improving security of locking or unlocking.

Figure 6:
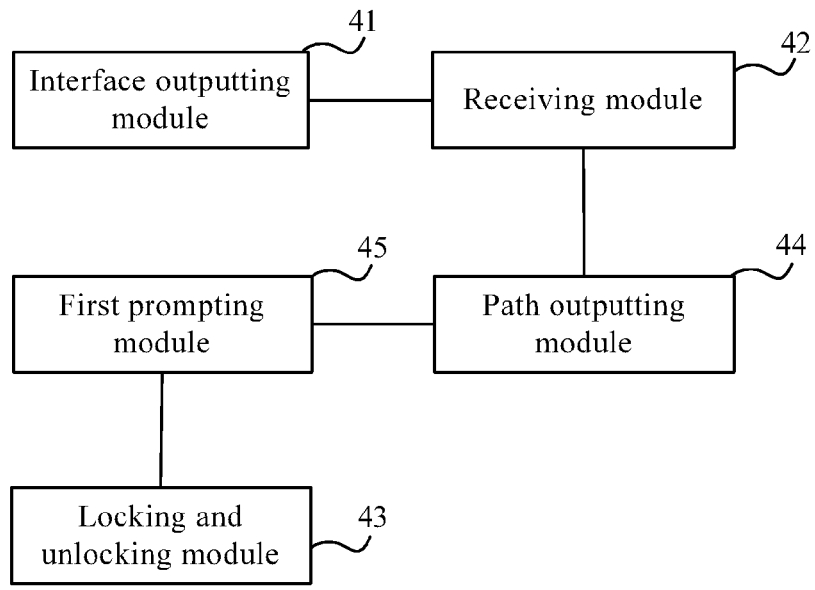
FIG. 6 is a schematic structural diagram of a device for locking and unlocking with a touch graphic according to the third embodiment of the present invention.

FIG. 6 is a schematic structural diagram of a device for locking and unlocking with a touch graphic according to the third embodiment of the present invention. As shown in FIG. 6, based on the embodiment corresponding to FIG. 4 or 5, the embodiment further includes a path outputting module 44 and a first prompting module 45.

The path outputting module 44 is configured to output a random path crossing a touch graphic received by the receiving module 42 on a graphic receiving interface.

The first prompting module 45 is configured to output first prompt information, where the first prompt information is used to prompt the user to perform a touch operation along the random path output by the path outputting module 44.

The locking and unlocking module 43 is further configured to: after receiving a touch signal generated when the user performs the touch operation along the random path output by the path outputting module 44, perform a locking or unlocking operation according to the touch graphic received by the receiving module 42.

Reference may be made to the description in the embodiment corresponding to FIG. 2A for specific operation of the above modules and no repeated description will be provided herein.

By using the device for locking and unlocking with a touch graphic according to the embodiment of the present invention, after a user inputs a touch graphic, the path outputting module 44 outputs a random path having common points with the touch graphic to the user on a graphic receiving interface, and the first prompting module 45 prompts the user to perform a touch operation on the touch screen along the random path, thereby forcing the user to remove the track left on the touch screen when the touch graphic is input. The locking and unlocking module 43 performs a locking or unlocking operation only after receiving a touch signal generated when the user performs a touch operation on the touch screen along the random path, which further improves security of locking or unlocking with the touch graphic.

Figure 7:
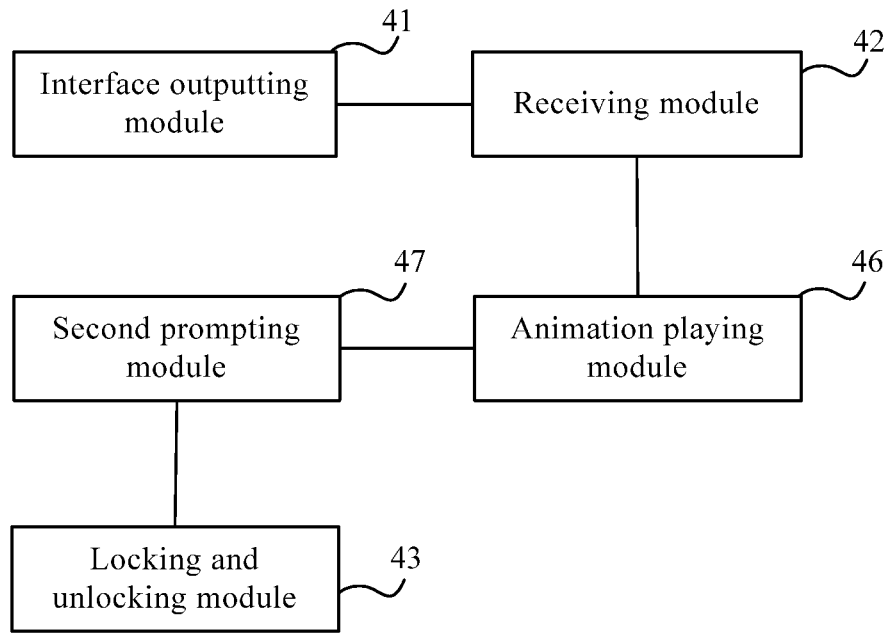
FIG. 7 is a schematic structural diagram of a device for locking and unlocking with a touch graphic according to the fourth embodiment of the present invention.

FIG. 7 is a schematic structural diagram of a device for locking and unlocking with a touch graphic according to the fourth embodiment of the present invention. As shown in FIG. 7, based on the embodiment corresponding to FIG. 4, FIG. 5, or FIG. 6, this embodiment further includes an animation playing module 46 and a second prompting module 47.

The animation playing module 46 is configured to output a random animation traversing a graphic receiving interface on the graphic receiving interface.

The second prompting module 47 is configured to output second prompt information, where the second prompt information is used to prompt the user to perform a touch operation following the random animation when the animation playing module 46 plays the random animation.

The locking and unlocking module 43 is further configured to perform a locking or unlocking operation according to the touch graphic after receiving a touch signal generated when the user performs the touch operation following the random animation played by the animation playing module 46.

Reference may be made to the description in the embodiment corresponding to FIG. 3A for specific operation of the above modules and no repeated description will be provided herein.

By using the device for locking and unlocking with a touch graphic according to the embodiment of the present invention, after a user inputs a touch graphic, the animation playing module 46 further plays a random animation traversing a graphic receiving interface to the user on the graphic receiving interface, and the second prompting module 47 prompts the user to perform a touch operation following the animation when the random animation is played. The locking and unlocking module 43 performs a locking or unlocking operation only after receiving a touch signal generated when the user performs the touch operation following the random animation when the random animation is played, thereby forcing the user to remove the track left on the touch screen when the user inputs the touch graphic, and further improving security of locking or unlocking with the touch graphic.

Figure 8:
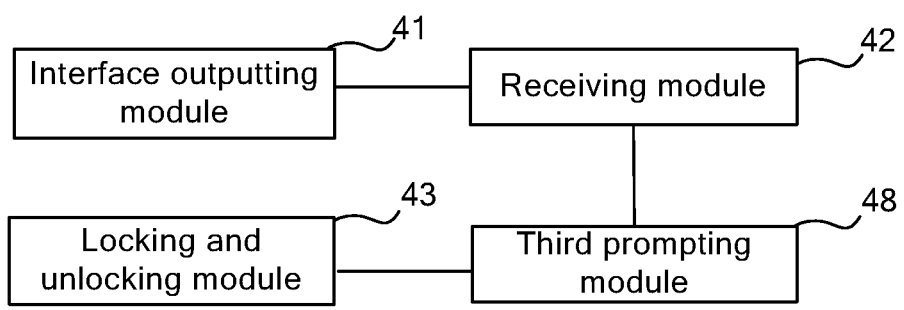
FIG. 8 is a schematic structural diagram of a device for locking and unlocking with a touch graphic according to the fifth embodiment of the present invention.
Figure 9:
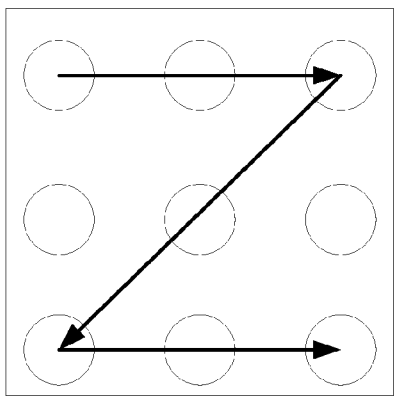
FIG. 9 is a schematic diagram of a graphic receiving interface in a method for locking and unlocking with a touch graphic in the prior art.

FIG. 8 is a schematic structural diagram of a device for locking and unlocking with a touch graphic according to the fifth embodiment of the present invention. As shown in FIG. 8, based on the embodiment corresponding to FIG. 4, FIG. 5, FIG. 6, or FIG. 7, this embodiment further includes a third prompting module 48.

The third prompting module 48 is configured to output third prompt information to prompt the user to actively wipe off a track of the touch graphic on the touch screen.

The locking and unlocking module 43 is further configured to perform a locking or unlocking operation according to the touch graphic after receiving a touch signal generated when the user wipes off the track of the touch graphic on the touch screen.

By using the device for locking and unlocking with a touch graphic according to the embodiment of the present invention, after a user inputs a touch graphic, the third prompting module 48 prompts the user to actively wipe off the track of the touch graphic on the touch screen. The locking and unlocking module 43 performs a locking or unlocking operation only after receiving a touch signal generated when the user wipes off the track of the touch graphic on the touch screen, thereby forcing the user to remove the track left on the touch screen when the touch graphic is input, and further improving security of locking or unlocking with the touch graphic.

Figure 11A:
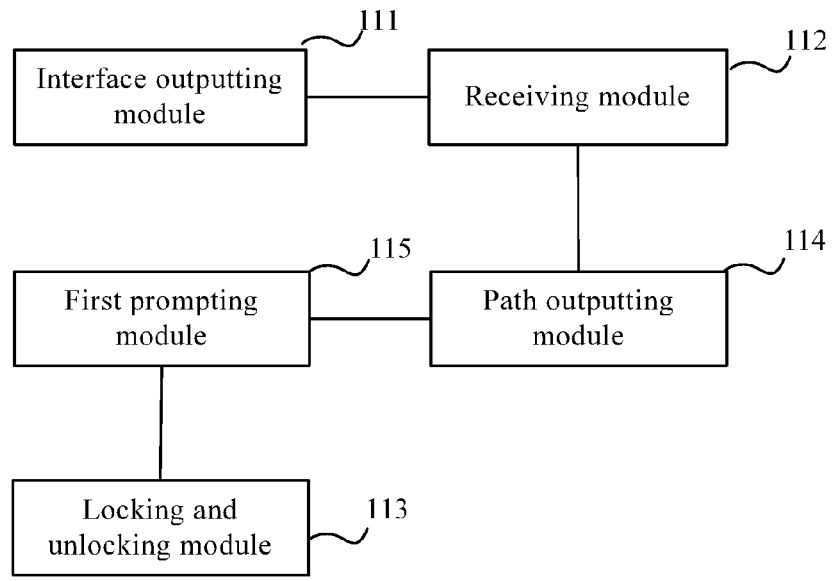
FIG. 11A, FIG. 11B, and FIG. 11C are schematic structural diagrams of a device for locking and unlocking with a touch graphic according to the sixth embodiment of the present invention.
Figure 11B:
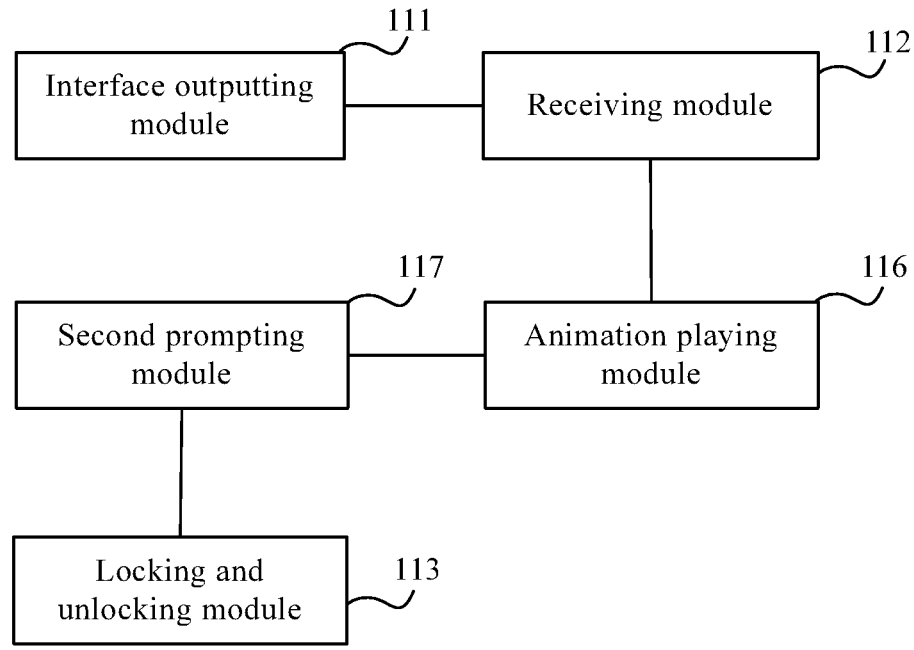
Figure 11C:
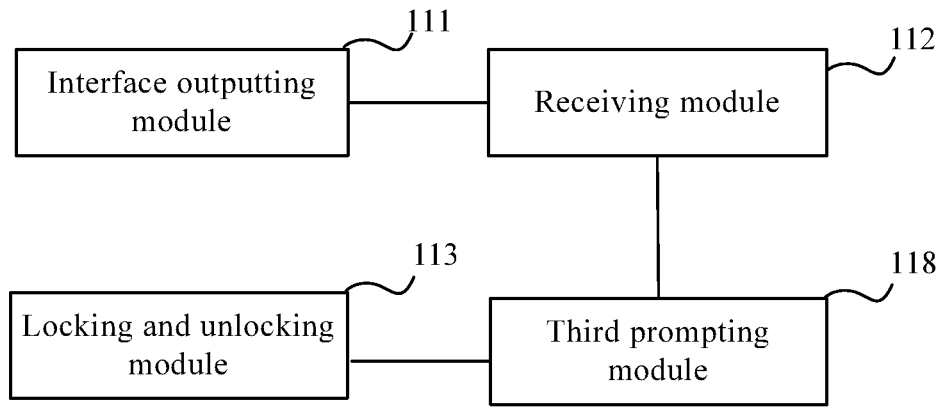

FIG. 11A, FIG. 11B, and FIG. 11C are schematic structural diagrams of a device for locking and unlocking with a touch graphic according to the sixth embodiment of the present invention. In the sixth embodiment, as shown in FIG. 11A, a device for locking and unlocking with a touch graphic includes an interface outputting module 111, a receiving module 112, and a locking and unlocking module 113.

The interface outputting module 111 is configured to output a graphic receiving interface, where the graphic receiving interface is normally provided with multiple touch points, and a user connects the multiple touch points on the graphic receiving interface by touching to form a touch graphic. Positions and coordinate directions of the multiple touch points on the graphic receiving interface are fixed here.

The receiving module 112 is configured to receive the touch graphic input by the user by touching through the graphic receiving interface output by the interface outputting module 111.

The locking and unlocking module 113 is configured to perform a locking or unlocking operation according to the touch graphic received by the receiving module 112.

Reference may be made to corresponding description in the sixth method embodiment and FIG. 10A and FIG. 10B for specific operation of the above modules and no repeated description will be provided herein.

In addition, as shown in FIG. 11A, the device for locking and unlocking with a touch graphic according to this embodiment may further include a path outputting module 114 and a first prompting module 115. The path outputting module 114 is configured to output a random path crossing the touch graphic received by the receiving module 112 on the graphic receiving interface. The first prompting module 115 is configured to output first prompt information, where the first prompt information is used to prompt the user to perform a touch operation along the random path output by the path outputting module 114. The locking and unlocking module 113 is specifically configured to: after receiving a touch signal generated when the user performs the touch operation along the random path output by the path outputting module 114, perform a locking or unlocking operation according to the touch graphic received by the receiving module 112.

Or as shown in FIG. 11B, the device for locking and unlocking with a touch graphic according to this embodiment may further include an animation playing module 116 and a second prompting module 117. The animation playing module 116 is configured to output a random animation traversing the graphic receiving interface on the graphic receiving interface. The second prompting module 117 is configured to output second prompt information, where the second prompt information is used to prompt the user to perform a touch operation following the random animation when the animation playing module 116 plays the random animation. The locking and unlocking module 113 is specifically configured to perform a locking or unlocking operation according to the touch graphic after receiving a touch signal generated when the user performs the touch operation following the random animation played by the animation playing module 116.

Or as shown in FIG. 11C, the device for locking and unlocking with a touch graphic according to this embodiment may further include a third prompting module 118. The third prompting module 118 is configured to output third prompt information to prompt the user to actively wipe off a track of the touch graphic on the touch screen. The locking and unlocking module 113 is specifically configured to perform a locking or unlocking operation according to the touch graphic after receiving a touch signal generated when the user wipes off the track of the touch graphic on the touch screen.

By using the device for locking and unlocking with a touch graphic according to the embodiment of the present invention, when a user performs locking or unlocking with a touch graphic, the device for locking and unlocking with a touch graphic provides a graphic receiving interface having fixed connection points to the user; then, after the user inputs a touch graphic, the device for locking and unlocking with a touch graphic may further output a random animation traversing the graphic receiving interface on the graphic receiving interface to the user, and prompt the user to perform a touch operation following the random animation when the random animation is played, and/or output a random path having common points with the touch graphic on the graphic receiving interface to the user, and prompt the user to perform a touch operation along the random path on the touch screen, and/or output third prompt information to prompt the user to actively wipe off a track of the touch graphic on the touch screen; and performs a locking and unlocking operation only after receiving a touch signal generated when the user performs the touch operation following the random animation, along the random path, or following the third prompt information, thereby forcing the user to remove the track left on the touch screen when the touch graphic is input, and further improving security of locking or unlocking with the touch graphic.

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments are performed. The storage medium may be any medium that is capable of storing program codes, such as a read-only memory (ROM), a random-access memory (RAM), a magnetic disk, or a compact disc read-only memory (CD-ROM).

Finally, it should be noted that the embodiments of the present invention are intended for describing the technical solutions of the present invention other than limiting the present invention. Although the present invention is described in detail with reference to the foregoing embodiments, persons of ordinary skill in the art should understand that they can still make modifications to the technical solution described in the foregoing embodiments or make equivalent substitutions to some technical features thereof, without departing from the spirit and scope of the technical solutions of the embodiments of the present invention.

What is claimed is:

1. A method for locking and unlocking with a touch graphic, comprising:
    outputting a randomly changed graphic receiving interface comprising a plurality of touch points;
    receiving a touch graphic input by a user by touching the graphic receiving interface;
    verifying the touch graphic input matches a stored touch graphic when the touch graphic input correctly touches the plurality of touch points;
    outputting, after verifying the touch graphic input, a random path crossing the touch graphic through at least one touch point of the plurality of touch points on the graphic receiving interface;
    outputting first prompt information, wherein the first prompt information is used to prompt the user to perform a touch operation along the random path;
    receiving a touch signal generated when the user performs the touch operation along the random path; and
    performing, after receiving the verified touch graphic input and the touch signal generated when the user performs the touch operation along the random path, a locking or unlocking operation according to the touch graphic.

2. The method of claim 1, wherein the random path comprises a random animation traversing the graphic receiving interface on the graphic receiving interface.

3. The method of claim 1, wherein after receiving the touch graphic input by the user by touching through the graphic receiving interface, the method further comprises outputting third prompt information to prompt the user to wipe off a track of the touch graphic on the graphic receiving interface, and wherein performing the locking or unlocking operation according to the touch graphic comprises performing, after receiving a touch signal generated when the user wipes off the track of the touch graphic on the graphic receiving interface, the locking or unlocking operation according to the touch graphic.

4. The method of claim 1, wherein outputting the randomly changed graphic receiving interface comprises outputting, after randomly changing a coordinate direction of the graphic receiving interface, the graphic receiving interface with a changed coordinate direction as the randomly changed graphic receiving interface.

5. A device for locking and unlocking with a touch graphic, comprising:
a display;
memory; and
at least one processor coupled to the memory, wherein the at least one processor is configured to:
output a randomly changed graphic receiving interface comprising a plurality of touch points on the display;
receive a touch graphic input by a user by touching the graphic receiving interface;
verify the touch graphic input matches a stored touch graphic when the touch graphic input correctly touches the plurality of touch points;
output, after verifying the touch graphic input, a random path crossing the touch graphic through at least one touch point of the plurality of touch points on the graphic receiving interface;
output first prompt information which is used to prompt the user to perform a touch operation along the random path;
receive a touch signal generated when the user performs the touch operation along the random path; and
perform, after receiving the verified touch graphic input and the touch signal generated when the user performs the touch operation along the random path, a locking or unlocking operation according to the touch graphic.

6. The device of claim 5, wherein output the randomly changed graphic receiving interface on the display comprises the at least one processor being configured to randomly change a coordinate direction of the graphic receiving interface, and output the graphic receiving interface with a changed coordinate direction as the randomly changed graphic receiving interface.

7. The device of claim 5, wherein the random path comprises a random animation traversing the graphic receiving interface on the graphic receiving interface.

8. The device of claim 5, wherein after the touch graphic input by the user by touching through the graphic receiving interface is received, the at least one processor is further configured to output third prompt information to prompt the user to wipe off a track of the touch graphic on the graphic receiving interface, and wherein perform the locking or unlocking operation according to the touch graphic comprises the at least one processor being configured to perform, after receiving a touch signal generated when the user wipes off the track of the touch graphic on the graphic receiving interface, the locking or unlocking operation according to the touch graphic.

9. A method for locking and unlocking with a touch graphic, comprising:
outputting a graphic receiving interface comprising a plurality of touch points;
receiving a touch graphic input by a user by touching the graphic receiving interface;
verifying the touch graphic input matches a stored touch graphic when the touch graphic input correctly touches the plurality of touch points;
prompting the user to destroy a track left on the graphic receiving interface when the user inputs the touch graphic, which comprises:
outputting, after verifying the touch graphic input, a random path on the graphic receiving interface, wherein the random path includes at least one touch point of the plurality of touch points; and
outputting first prompt information which is used to prompt the user to perform a touch operation along the random path; and
receiving a touch signal generated when the user performs the touch operation along the random path; and
performing, after receiving the verified touch graphic input and the touch signal generated when the user performs the touch operation along the random path, a locking or unlocking operation according to the touch graphic.

10. The method of claim 9, wherein the random path comprises a random animation traversing the graphic receiving interface on the graphic receiving interface.

11. A device for locking and unlocking with a touch graphic, comprising:
a display;
memory; and
at least one processor coupled to the memory, wherein the at least one processor is configured to:
output a randomly changed graphic receiving interface on the display comprising a plurality of touch points,
receive a touch graphic input by a user by touching through the graphic receiving interface,
verify the touch graphic input matches a stored touch graphic When the touch graphic input correctly touches the plurality of touch points,
prompt the user to destroy a track left on the graphic receiving interface when the user inputs the touch graphic, which comprises:
outputting, after verifying the touch graphic input, a random path crossing the touch graphic on the graphic receiving interface, wherein the random path includes at least one touch point of the plurality of touch points; and
outputting first prompt information which is used to prompt the user to perform a touch operation along the random path; and
receive a touch signal generated when the user performs the touch operation along the random path; and
perform, after receiving the verified touch graphic input and the touch signal generated when the user performs the touch operation along the random path, a locking or unlocking operation according to the touch graphic.

12. The device of claim 11, wherein the random path comprises a random animation traversing the graphic receiving interface on the graphic receiving interface.

13. The device of claim 11, wherein the touch operation along the random path is non-linear.

14. The method of claim 1, wherein the touch operation along the random path is non-linear.

15. The device of claim 5, wherein the touch operation along the random path is non-linear.

16. The method of claim 9, wherein the touch operation along the random path is non-linear.

* * * * *